United States Patent
Mattivi et al.

(10) Patent No.: US 12,190,252 B2
(45) Date of Patent: Jan. 7, 2025

(54) EXPLAINABLE UNSUPERVISED VECTOR REPRESENTATION OF MULTI-SECTION DOCUMENTS

(71) Applicant: Optum Services (Ireland) Limited, Dublin (IE)

(72) Inventors: Riccardo Mattivi, Dublin (IE); Peter Cogan, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 949 days.

(21) Appl. No.: 17/141,775

(22) Filed: Jan. 5, 2021

(65) Prior Publication Data
US 2022/0215274 A1 Jul. 7, 2022

(51) Int. Cl.
| | |
|---|---|
| *G06N 5/04* | (2023.01) |
| *G06F 16/34* | (2019.01) |
| *G06F 18/23213* | (2023.01) |
| *G06N 20/00* | (2019.01) |

(52) U.S. Cl.
CPC ............. *G06N 5/04* (2013.01); *G06F 16/345* (2019.01); *G06F 18/23213* (2023.01); *G06N 20/00* (2019.01)

(58) Field of Classification Search
CPC ........ G06N 5/04; G06N 20/00; G06F 16/345; G06F 18/23213
See application file for complete search history.

(56) References Cited

U.S. PATENT DOCUMENTS

| | | | |
|---|---|---|---|
| 7,818,308 B2 | 10/2010 | Carus et al. | |
| 10,216,715 B2 | 2/2019 | Broderick et al. | |
| 10,565,234 B1 * | 2/2020 | Sims ................. | G06F 40/12 |

(Continued)

FOREIGN PATENT DOCUMENTS

WO    WO-2018006072 A1 *  1/2018  ........... G06F 21/645

OTHER PUBLICATIONS

Ash, Elliott et al. "Unsupervised Extraction of Workplace Rights and Duties From Collective Bargaining Agreements," In 2nd International Workshop on Mining and Learning in the Legal Domain (MLLD-2020)(virtual), Nov. 2020, (9 pages), Sorrento, Italy. DOI: 10.3929/ethz-b-000453825.

*Primary Examiner* — Alan Chen
(74) *Attorney, Agent, or Firm* — Alston & Bird LLP

(57) ABSTRACT

Embodiments of the present disclosure provide methods, apparatus, systems, computing devices, computing entities, and/or the like for generating an inferred document representation for a multi-section document using a machine learning model. In accordance with one embodiment, a method is provided that includes: identifying a document corpus comprising the multi-section document and other multi-section documents; for each section of the document that is associated with a section type identifier: identifying a section batch that comprises common-type sections across the document corpus; and processing the section batch using the machine learning model to generate per-type section clusters for the section type identifier that comprise an inferred per-type section cluster for the current section; generating the inferred document representation based at least in part on each inferred per-type section cluster for a section of the document; and performing a prediction-based action based at least in part on the representation.

20 Claims, 12 Drawing Sheets

(56) References Cited

U.S. PATENT DOCUMENTS

| | | |
|---|---|---|
| 10,747,958 B2 | 8/2020 | Nelson et al. |
| 2003/0115080 A1 | 6/2003 | Kasravi et al. |
| 2008/0109425 A1* | 5/2008 | Yih .................... G06F 16/345 |
| | | 707/999.005 |
| 2018/0137107 A1 | 5/2018 | Buccapatnam Tirumala et al. |
| 2018/0365201 A1 | 12/2018 | Hunn et al. |
| 2019/0354584 A1* | 11/2019 | Wallenfelt ............ G06F 40/131 |
| 2020/0327151 A1* | 10/2020 | Coquard ............. G06F 16/3347 |
| 2021/0365306 A1* | 11/2021 | Haldar .................. G06F 40/205 |

* cited by examiner

Prediction: Overpayment
Score: 0.98

Relevant Features:
amt_pd = $11,678,
daper_type = PPR,
dischrd_cd = 1,

Relevant Contract
Features:
Section_2.2.2,
Section_2.2.2 is related
to XYZ of contract in
relation to ABC of
inpatient facilities...etc.
Section_Appendix_1.1,

EXPLAINABLE UNSUPERVISED VECTOR REPRESENTATION OF MULTI-SECTION DOCUMENTS

TECHNOLOGICAL FIELD

Embodiments of the present disclosure generally relate to systems and methods for extracting, processing, and encoding unstructured content from multi-section documents to facilitate increased performance for analytics and machine learning systems.

BACKGROUND

A need exists in the industry to address technical challenges related to extracting, processing, and encoding unstructured content from multi-section documents to a suitable structured format that can then be used for data analytics and machine learning purposes. It is with respect to these considerations and others that the disclosure herein is presented.

BRIEF SUMMARY

In general, embodiments of the present disclosure provide methods, apparatus, systems, computing devices, computing entities, and/or the like for generating an inferred document representation for a multi-section document using an unsupervised section clustering machine learning model. In accordance with one aspect of the disclosure, a method for generating an inferred document representation for a multi-section document using an unsupervised section clustering machine learning model is provided. In various embodiments, the method includes: identifying a document corpus comprising the multi-section document and a plurality of other multi-section documents; for each current section of a plurality of sections of the multi-section document that is associated with a current section type identifier of a plurality of document-wide section type identifiers: identifying a section batch for the current section type identifier that comprises a plurality of common-type sections that are associated with the current section type identifier, wherein the plurality of common-type sections comprises the current section and one or more other sections that are associated with the current section type identifier across the plurality of other multi-section documents; and processing the section batch using the unsupervised section clustering machine learning model to generate a plurality of per-type section clusters for the current section type identifier, wherein: (i) each per-type section cluster of the plurality of per-type section clusters comprises a related section subset of the plurality of common-type sections, and (ii) the plurality of per-type section clusters comprises an inferred per-type section cluster for the current section; generating the inferred document representation based at least in part on each inferred per-type section cluster for a section of the plurality of sections; and performing one or more prediction-based actions based at least in part on the inferred document representation.

In accordance with another aspect of the present disclosure, an apparatus is provided. In various embodiments, the apparatus includes at least one processor and at least one memory including program code. The at least one memory and the program code are configured to, with the at least one processor, cause the apparatus to at least: identify a document corpus comprising the multi-section document and a plurality of other multi-section documents; for each current section of a plurality of sections of the multi-section document that is associated with a current section type identifier of a plurality of document-wide section type identifiers: identify a section batch for the current section type identifier that comprises a plurality of common-type sections that are associated with the current section type identifier, wherein the plurality of common-type sections comprises the current section and one or more other sections that are associated with the current section type identifier across the plurality of other multi-section documents; and process the section batch using the unsupervised section clustering machine learning model to generate a plurality of per-type section clusters for the current section type identifier, wherein: (i) each per-type section cluster of the plurality of per-type section clusters comprises a related section subset of the plurality of common-type sections, and (ii) the plurality of per-type section clusters comprises an inferred per-type section cluster for the current section; generate the inferred document representation based at least in part on each inferred per-type section cluster for a section of the plurality of sections; and perform one or more prediction-based actions based at least in part on the inferred document representation.

In accordance with yet another aspect of the present disclosure, a computer program product is provided. In particular embodiments, the computer program product includes a non-transitory computer storage medium having instructions stored therein. The instructions being configured to cause one or more computer processors to at least perform operations configured to: identify a document corpus comprising the multi-section document and a plurality of other multi-section documents; for each current section of a plurality of sections of the multi-section document that is associated with a current section type identifier of a plurality of document-wide section type identifiers: identify a section batch for the current section type identifier that comprises a plurality of common-type sections that are associated with the current section type identifier, wherein the plurality of common-type sections comprises the current section and one or more other sections that are associated with the current section type identifier across the plurality of other multi-section documents; and process the section batch using the unsupervised section clustering machine learning model to generate a plurality of per-type section clusters for the current section type identifier, wherein: (i) each per-type section cluster of the plurality of per-type section clusters comprises a related section subset of the plurality of common-type sections, and (ii) the plurality of per-type section clusters comprises an inferred per-type section cluster for the current section; generate the inferred document representation based at least in part on each inferred per-type section cluster for a section of the plurality of sections; and perform one or more prediction-based actions based at least in part on the inferred document representation.

In particular embodiments, a section schema may be identified that is associated with the document corpus. Accordingly, the section schema may describe a group of corpus-wide section type identifiers for the document corpus, and the group of corpus-wide section type identifiers may comprise the plurality of document-wide section type identifiers. In some embodiments, the inferred document representation may describe a plurality of per-type section cluster identifiers, each per-type section cluster identifier of the plurality of per-type section cluster identifiers may be associated with a corpus-wide section type identifier of the group of corpus-wide section type identifiers, the per-type section cluster identifier for a corpus-wide section type identifier of the group of corpus-wide section type identifiers that is among the plurality of document-wide section types may describe the inferred per-type section cluster for the section of the plurality of sections that is associated with the document-wide section type identifier, and the per-type section cluster identifier for a corpus-wide section type identifier of the group of corpus-wide section type identifiers that is not among the plurality of document-wide section types may describe a default numerical value.

In addition, in particular embodiments, each per-type section cluster of the plurality of per-type section clusters may be processed using a document summarization machine learning model to generate a per-type section cluster summary for the per-type section cluster. In some embodiments, the per-type section cluster summary is generated by processing the related section subset for the per-type section cluster using the document summarization machine learning model to generate the per-type section cluster summary.

Further, in particular embodiments, the one or more prediction-based actions may be performed to cause presentation of a prediction output user interface. In some embodiments, the prediction output user interface may describe a multi-section document summary for the multi-section document, and the multi-section document summary may describe each per-section type cluster summary for a per-type section cluster of the plurality of per-type section clusters. In some embodiments, the prediction output user interface may describe the inferred document representation. In some embodiments, the prediction output user interface may describe a multi-section document summary for the multi-section document.

BRIEF DESCRIPTION OF THE SEVERAL VIEWS OF THE DRAWINGS

Figure 1:
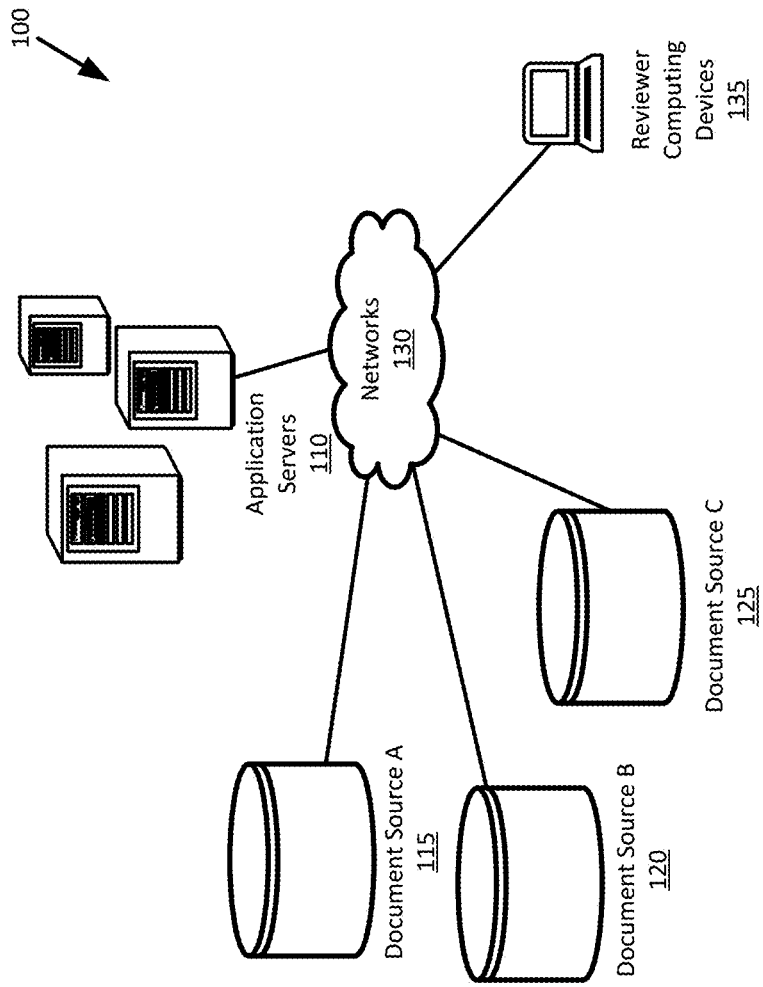
Figure 2:
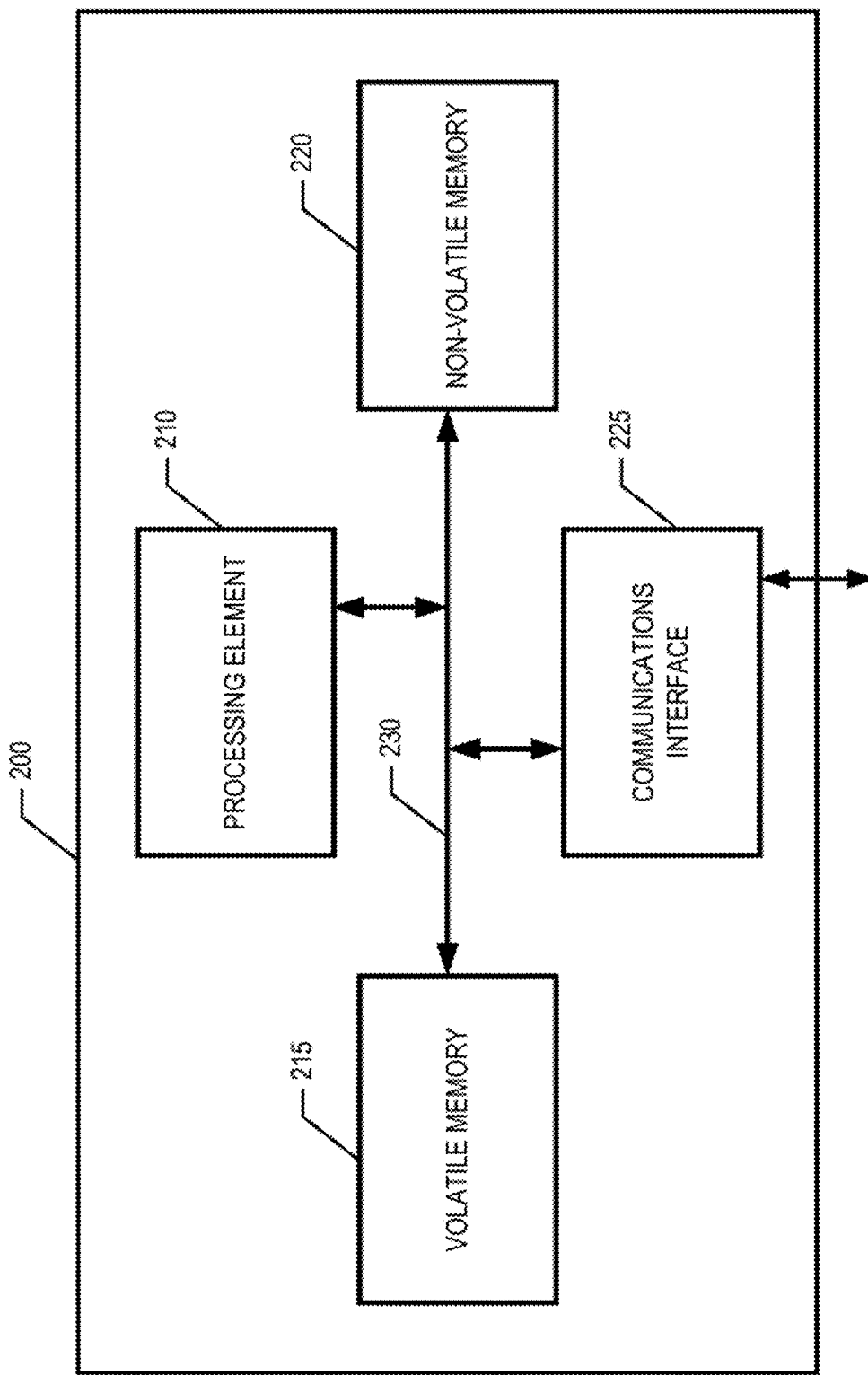
Figure 3:
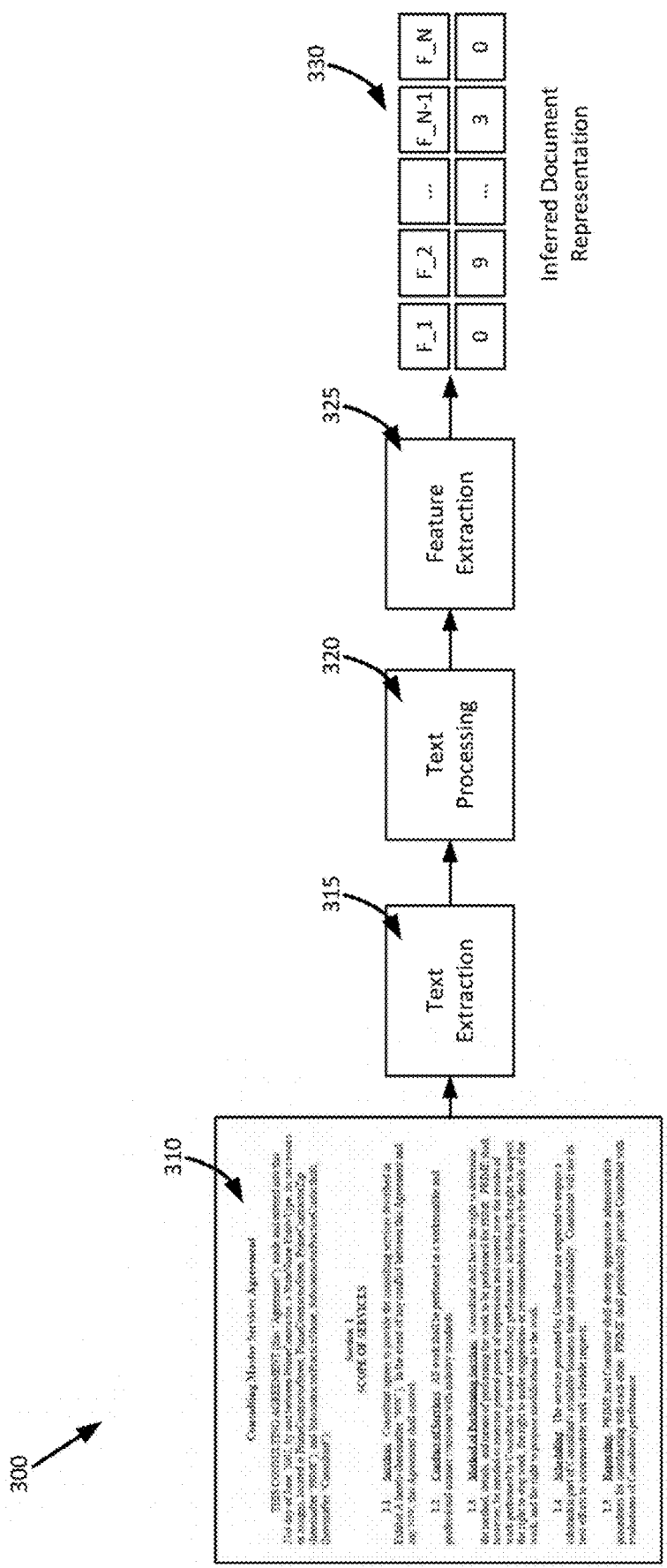
Figure 4:
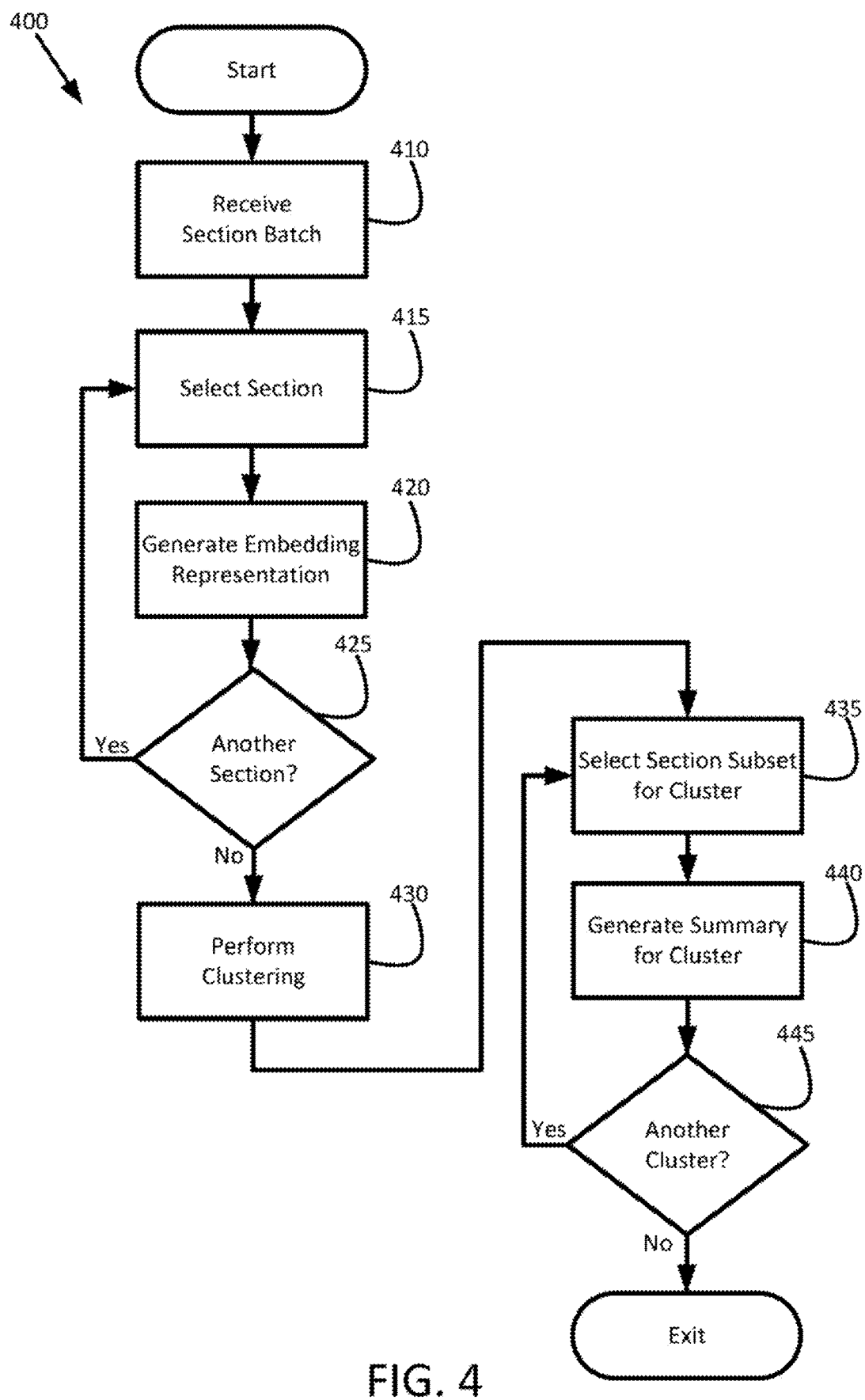
Figure 5:
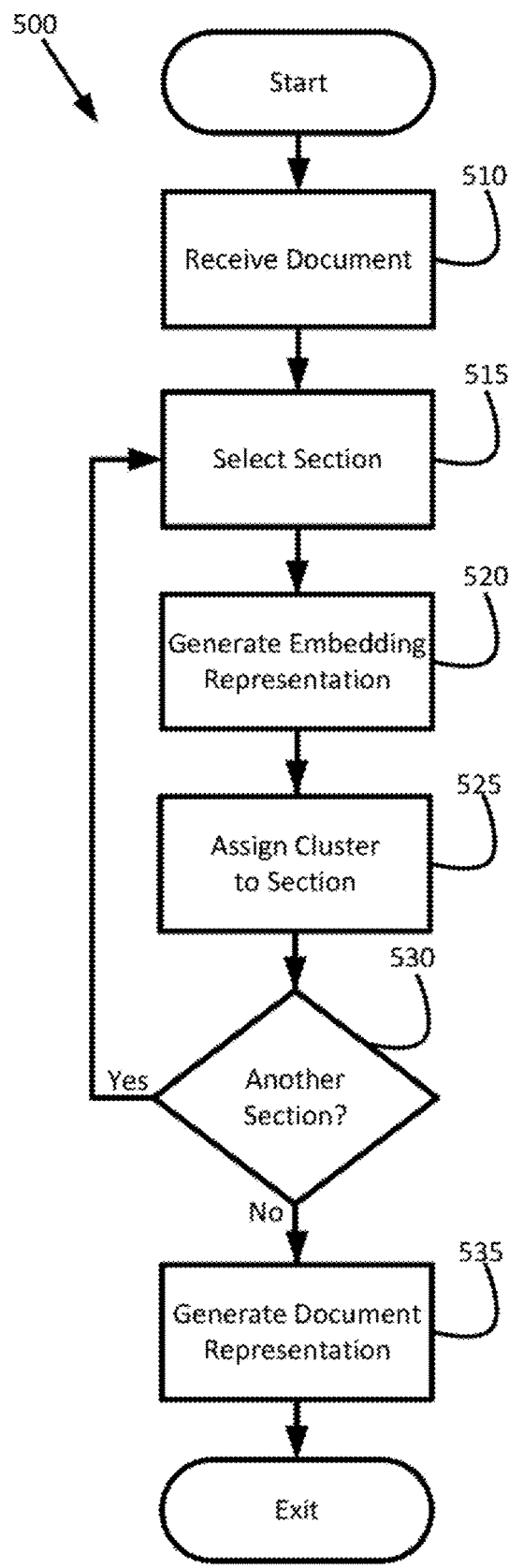
Figure 6:
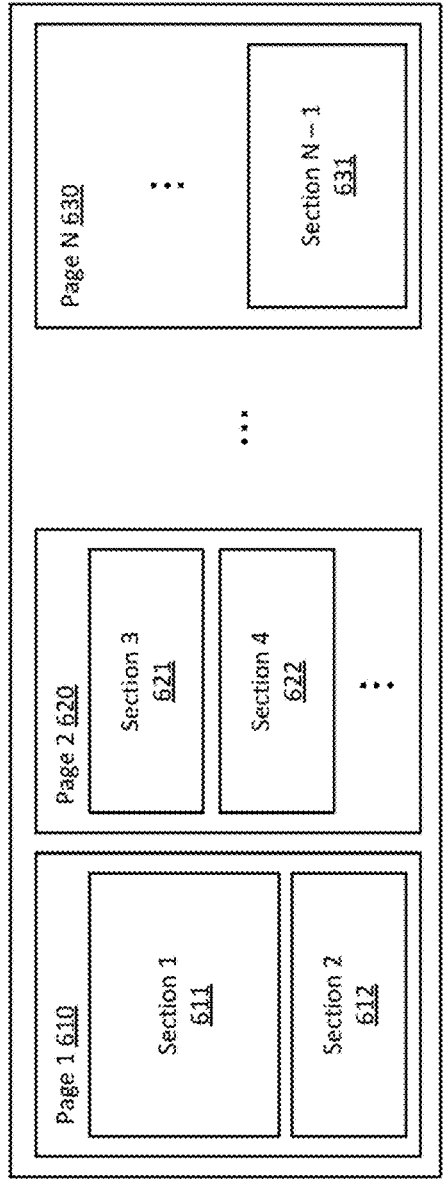
Figure 6:
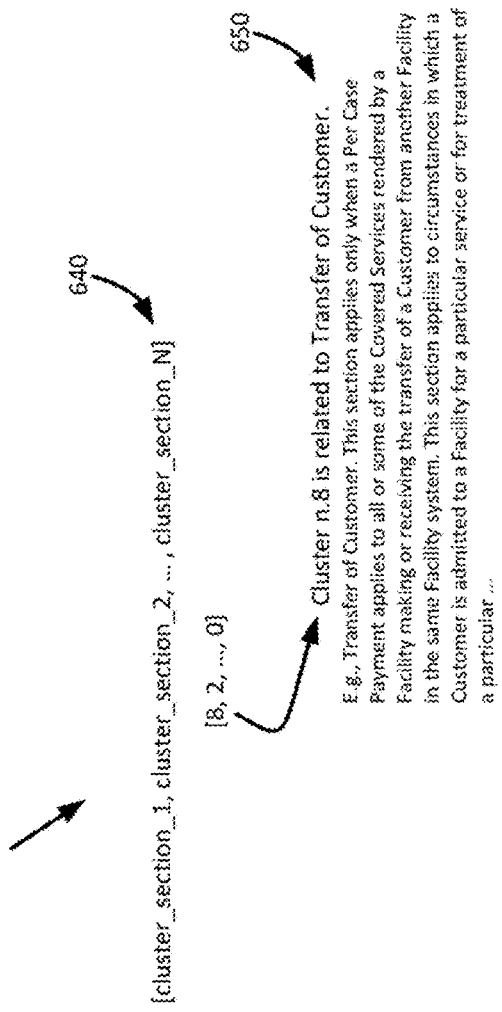
Figure 7:
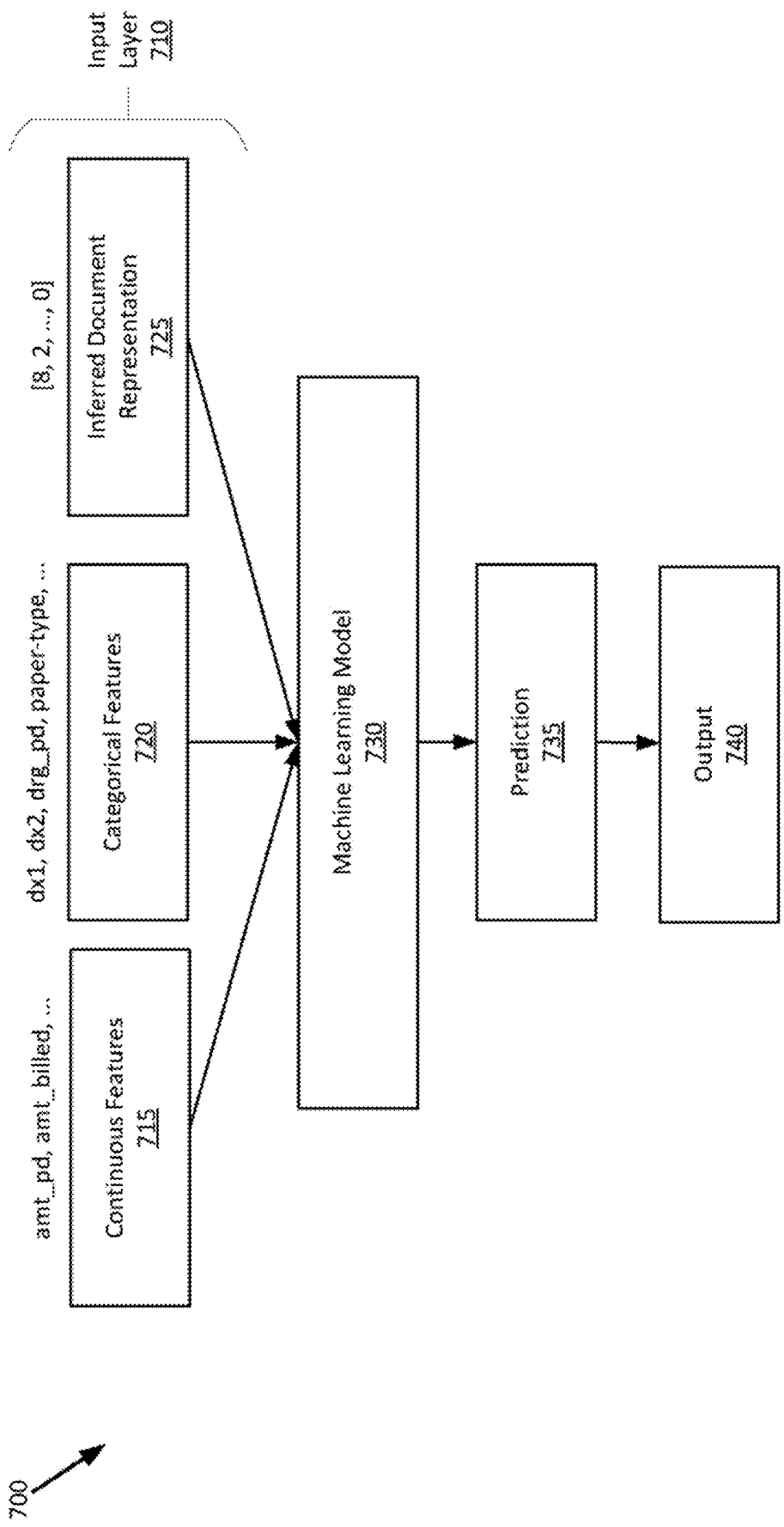
Figure 8A:
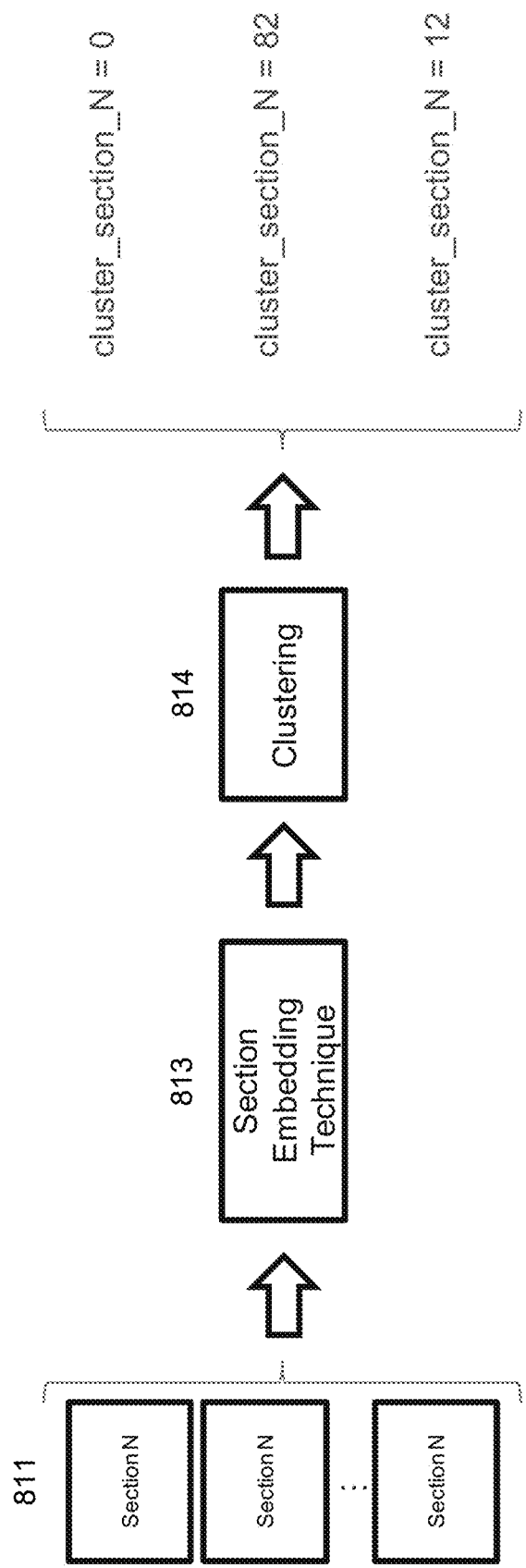
Figure 8B:
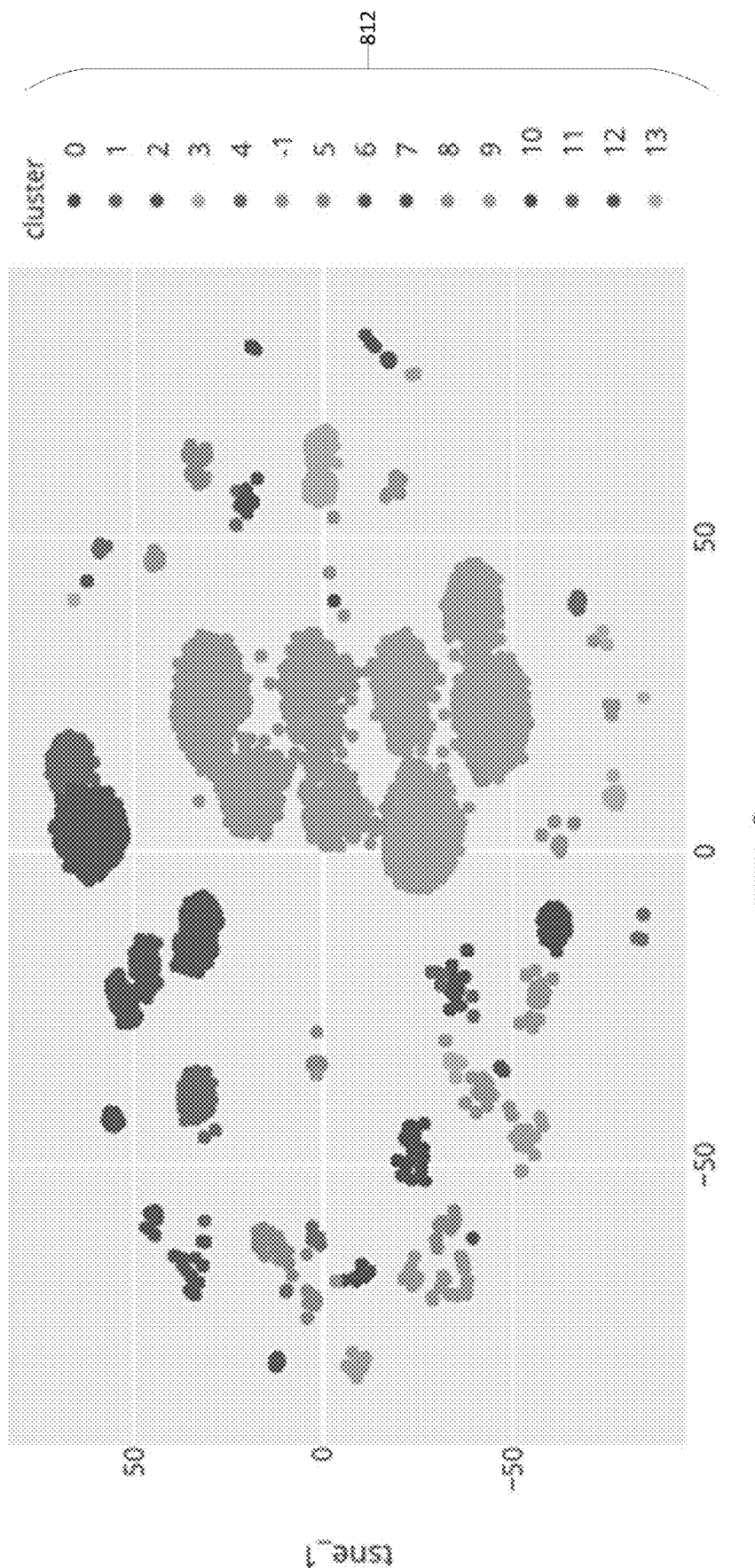
Figure 9:
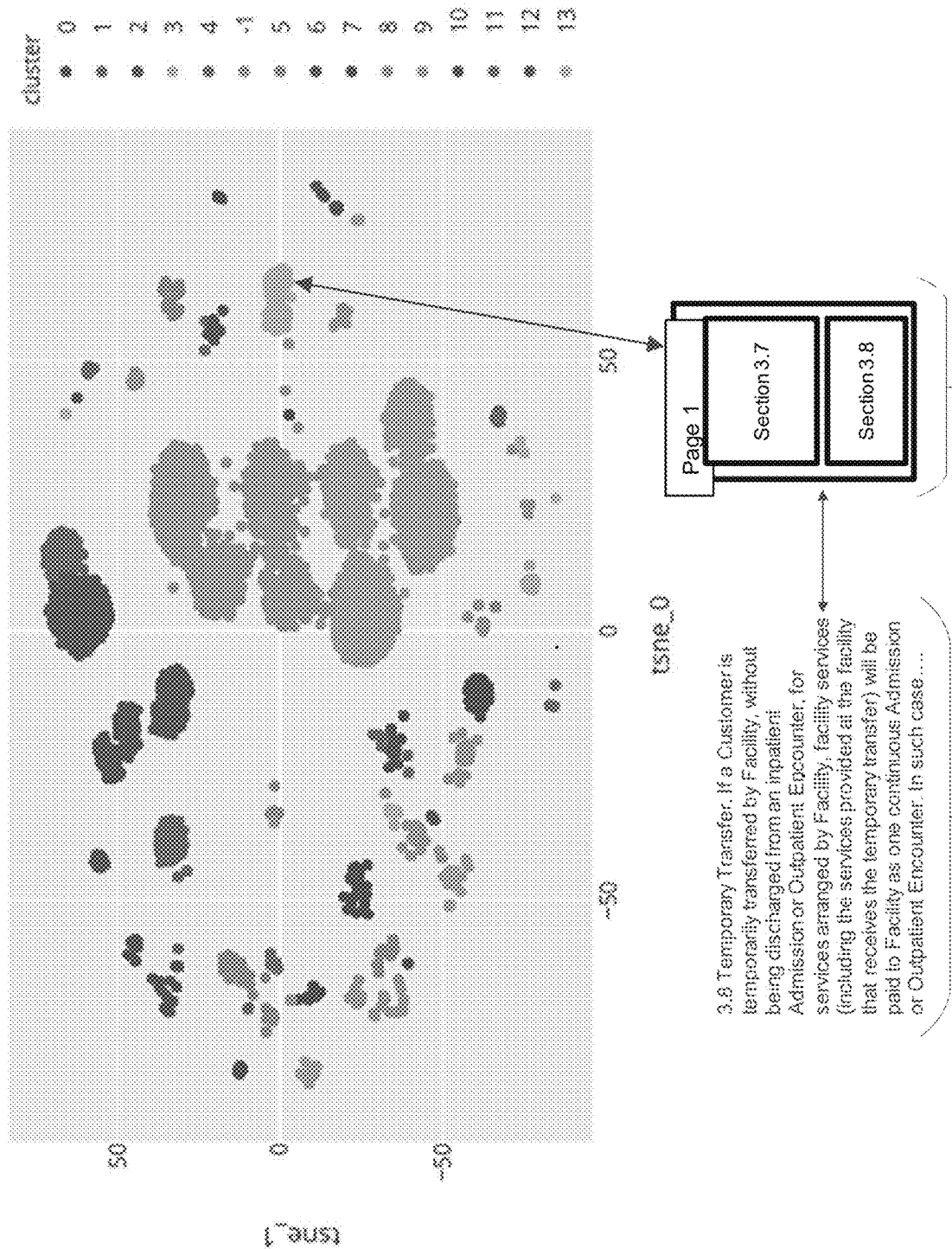
Figure 10:
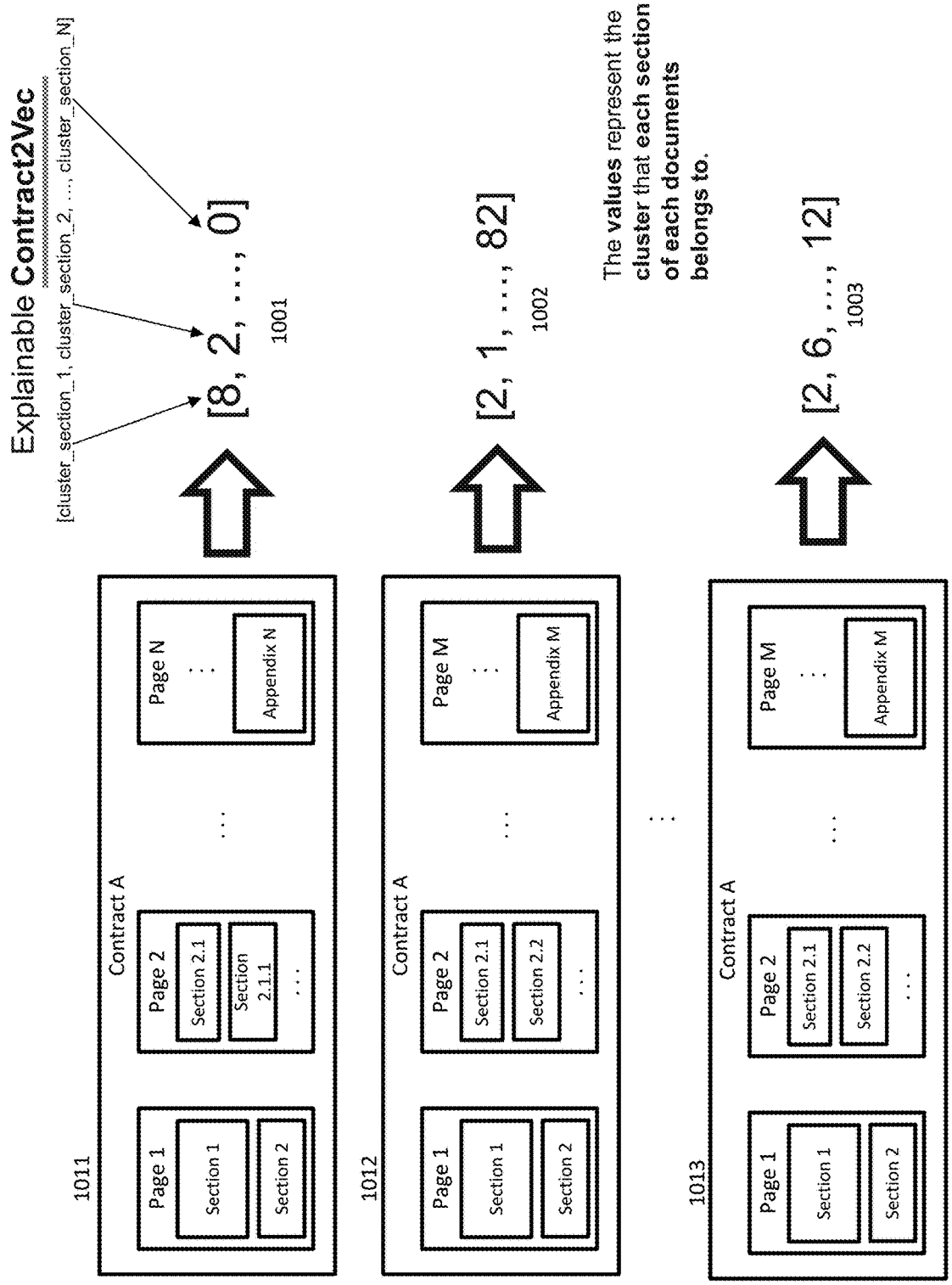
Figure 11:
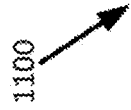

Having thus described the disclosure in general terms, reference will now be made to the accompanying drawings, which are not necessarily drawn to scale, and wherein:

FIG. 1 is a diagram of a system architecture that can be used in conjunction with various embodiments of the present disclosure;

FIG. 2 is a schematic of a computing entity that may be used in conjunction with various embodiments of the present disclosure;

FIG. 3 is an overview of a content extraction process that can be used in extracting content from documents in accordance with various embodiments of the present disclosure;

FIG. 4 is a process flow for generating section clusters for various sections found in documents in accordance with various embodiments of the present disclosure;

FIG. 5 is a process flow for generating an inferred document representation for a document in accordance with various embodiments of the present disclosure;

FIG. 6 is an example of an inferred document representation generated for a contract in accordance with various embodiments of the present disclosure;

FIG. 7 is an example of using an inferred document representation of a multi-section document generated in accordance with various embodiments of the present disclosure;

FIG. 8A is an example of a section batch in accordance with various embodiments of the present disclosure;

FIG. 8B is an example of generating per-type section clusters based at least in part on a section batch in accordance with various embodiments of the present disclosure;

FIG. 9 is an example of generating a per-type section cluster summary based at least in part on a section subset that includes each section that is in a corresponding per-type section cluster in accordance with various embodiments of the present disclosure;

FIG. 10 provides examples of inferred document representations for three multi-section documents in accordance with various embodiments of the present disclosure; and FIG. 11 is an example of a prediction output user interface in accordance with various embodiments of the present disclosure.

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

Overview

Embodiments of the disclosure use a novel unsupervised embedding approach that automatically encodes and stores valuable and interpretable information from documents. More specifically, various embodiments of the disclosure are directed to automated systems and methods for extracting, processing, and encoding content (e.g., data) available in documents using a structured representation that enables other automated systems performing various tasks to use the structure to infer semantic characteristics of the content found in sections of the documents. Accordingly, in particular embodiments, the structured representation may include specific information with respect to each section found within a document. For example, these sections may entail structured divisions found within the document such as chapters, sub-chapters, appendix, summaries, abstracts, conclusions, articles, and/or the like. Typically, these sections are provided in a document to organize the document into meaningful divisions of content that assist the reader's comprehension of the document. Thus, embodiments of the disclosure provide a structured representation providing information on the various sections found in documents to convey a granularity of semantic characteristics with respect to the content found in the documents that is not normally available using conventional natural language processing.

For example, in some embodiments, the structured representation may be a representation of the document provided as a feature vector having values for the various sections found in the document. Here, each of the values may identify the type of content found in the particular section associated with the value. Accordingly, in particular embodiments, the values that can be assigned to a particular section may be developed for the section based at least in part on a novel approach involving clustering embedded representations of semantic characteristics for samples of the section gathered from a document corpus of similar types of documents. Therefore, the value may identify a cluster assigned to a section of a particular document and the identified cluster provides an explanation of the content found within the section of the document.

Definitions of Certain Terms

The term "multi-section document" may refer to a data object that represents a collection of text data, where the text data is divided into two or more sections. The multi-section document may thus be an item on which semantic information on content arranged within sections (e.g., segments, portions, divisions, and/or the like) of the item is extracted, processed, and encoded into a structure format in various embodiments. Accordingly, the sections may be formally identified and/or designated within the document. For instance, in particular embodiments, the multi-section document may be an electronic record of an insurance contract having various sections (e.g., articles) detailing rules and regulations between service providers (e.g., physicians and hospitals) and insurers. While in other embodiments, the multi-section document may be an electronic record of a technical manual for equipment used in a particular industry such as, for example, a technical manual for a computer cluster system used in a cloud environment. Here, the information provided in the technical manual may be arranged within various sections of the manual such as chapters, sub-chapters, appendices, and/or the like. As those of ordinary skill in the art will understand in light of this disclosure, a multi-section document may be a number of different types of items containing content arranged within sections of the items.

The term "document corpus" may refer to a collection of multi-section documents that are used in training a clustering machine learning model. In various embodiments, the document corpus may involve a collection of documents related to a specific purpose. For example, the document corpus may include a collection of contracts used for a particular industry such as the insurance industry. In this example, each of the contracts may be formatted into sections providing content such as the terms and conditions for the contract. As detailed further herein, the document corpus may be used in various embodiments in training a clustering machine learning model configured for identifying a classification (cluster) for each section of a contract in which the classification may indicate a type of content (semantics) found in the section of the contract.

The term "section type identifier" may refer to a data object that represents a specific type of section found within multi-section documents. For instance, in particular embodiments, a section type identifier may be an alphanumerical value, title, name, header, and/or the like representing a specific type of section found within documents. In some embodiments, a section type identifier may be based at least in part on content (e.g., text) found within the document. For example, a section type identifier for a particular type of section found within documents representing contracts may be the title "Article I," which is the title of the particular type of section as explicitly stated in the contracts. As another example, a section type identifier for a particular type of section may describe that the particular type of section describes "definition" sections of a contract.

The term "section schema" may refer to a data object representing an arrangement of different sections found in the multi-section documents associated with a document corpus, where each section described by the section schema occurs in at least one of the multi-section documents in the document corpus. Accordingly, in various embodiments, the section schema describes a group of corpus-wide section type identifiers for the document corpus. With that said, a document may include one or more sections related to the corpus-wide section type identifiers. However, the document may not necessarily include a section for every corpus-wide section type identifier. Therefore, the identifiers related to the sections found in the document may be refer to as the document-wide section type identifiers for the document.

The term "section batch" may refer to one or more common-type sections of content found in a corpus of multi-section documents that are related to a section type identifier. For example, a section batch may include the common-type sections of content (e.g., text) found in multi-section documents of a corpus of contracts in which each of the common-type sections of content found in the section batch is associated with (e.g., found under) the section type identifier "Article III" in the contracts. Here, in particular embodiments, each of the common-type sections may be represented by a structured representation identifying semantic characteristics of the content (e.g., text) found in the common-type section. For example, in some embodiments, the structured representation for a particular common-type section may be based at least in part on an embedding performed on the text found in the common-type section that provides a feature vector having a plurality of dimension values representing various semantic characteristics of the content of the common-type section.

The term "section clustering machine learning model" may refer to a data object that describes parameters and/or hyper-parameters (e.g., defined operations) of a machine learning model that is configured to identify/generate clusters for a section batch associated with a specific section type identifier found in a document corpus. For instance, in various embodiments, the section clustering machine learning model may be an unsupervised machine learning model configured to process the section batch for the related section type identifier and generate a plurality of per-type section clusters for the section type identifier. For example, in some embodiments, the section clustering machine learning model may be a k-means clustering model, sequential clustering model, Gaussian mixture model, and/or the like. Here, each of the common-type sections found in the section batch for the section type identifier may be represented by a structured representation identifying semantic characteristics of the common-type section. Accordingly, these structured representations may be used in training the section clustering machine learning model to generate the plurality of per-type section clusters for the section type identifier. In particular embodiments, each per-type section cluster for the related section type identifier includes a related section subset of the plurality of common-type sections associated with the related section type identifier in which the related section subset is clustered based at least in part on the common-type sections found in the subset having common/similar semantic characteristics. Once trained, the section clustering machine learning model may be used in various embodiments to identify an inferred per-type section cluster from the plurality of per-type section clusters for a particular section found in a multi-section document.

The term "inferred document representation" may refer to a data object that describes a structured representation of a multi-section document, where the structured representation describes each per-type section cluster identifier for each per-type section cluster for each section of the multi-section document. For instance, in particular embodiments, the inferred document representation may be a feature vector having a value for each section found in the multi-section document. Here, each value may identify an inferred per-type section cluster based at least in part on a plurality of per-type section clusters computed for the section type identifier related to the section. Accordingly, in some embodiments, the inferred document representation for the multi-section document may be generated by using the section clustering machine learning model. As further detailed herein, a structured representation (e.g., feature vector) representing semantic characteristics may be generated for each section found in the multi-section document through some technique such as embedding, and the structured representation may be provided as input to the section clustering machine learning model to identify the corresponding inferred per-type section cluster in generating the inferred document representation.

The term "per-type section cluster identifier" may refer to a value or more found in the inferred document representation for a particular multi-section document that describes the per-type section cluster for a corresponding section of the particular multi-section document. In various embodiments, the inferred document representation for the multi-section document includes a per-type section cluster identifier for each corpus-wide section type identifier. Here, in particular embodiments, the per-type section cluster identifier for a particular corpus-wide section type identifier may describe the inferred per-type section cluster for a section of the document associated with the corpus-wide section type identifier if the section is found in the document, that is to say, if the per-type section cluster identifier is associated with a document-wide section type identifier. Otherwise, the per-type section cluster identifier for the corpus-wide section type identifier may describe a default numerical value (e.g., zero value). Accordingly, this default numerical value may be recognized in particular embodiments as indicating the document does not contain a section related to the corpus-wide section type identifier.

The term "document summarization machine learning model" may refer to a data object that describes parameters and/or hyper-parameters (e.g., defined operations) of a machine learning model used in developing a per-type section cluster summary for each per-type section cluster generated for a particular section type identifier. The per-type section cluster summary may provide a summary (e.g. brief explanation) of the content found in a section that has been assigned to the cluster. For instance, in particular embodiments, the document summarization machine learning model may be a natural language processing model. Here, the document summarization machine learning model may be configured to process the content found in the section subset of the plurality of common-type sections associated with a per-type section cluster identifier for a related section type identifier to generate the per-type section cluster summary. Accordingly, the per-type section cluster summary may be used in some embodiments in generating a presentation of a prediction output user interface that may provide a user with a summary of the content that may be found in the different sections of a document. This summary may be referred to as a multi-section document summary.

Exemplary Technical Contributions

Many automated systems use content extracted from documents in carrying out various computational tasks such as, for example, data mining, data analysis, operations control, order processing, inventory management, and/or the like. Oftentimes, the content found in documents is unstructured and must be converted into a structured representation that enables further processing by an automated system. For example, many health insurance providers have automated adjudication systems for processing insurance claims for purposes of determining whether or not to make payments on the claims to healthcare service providers (e.g., physicians and hospitals). Such automated systems are vital to many of these insurance providers due to the extensive volume of claims that need to be processed.

In many instances, contracts are put into place between the insurance providers and the healthcare service providers defining rules and regulations between the parties. These rules and regulations can be very important to the automated adjudication systems in determining proper payment on various insurance claims with respect to amount of payment, reason for payment, and/or making payment to the correct entity. To ensure that all relevant information from these contracts is available in the adjudication systems, the content from the contracts needs to be extracted and converted into a suitable structured format. This is often accomplished by individuals (employees) who read the contracts and manually annotate and convert the relevant content from the contracts into a usable structured representation that is made available to the claim adjudication systems. However, such a manual process can be extensive, time consuming, and demanding, taking up to several months in some instances to complete. In addition, these manual processes are also prone to errors (e.g., prone to codifying errors and/or missing information).

Some automated solutions for extracting content from documents have been developed, but many of these solutions have several disadvantages. For example, many conventional natural language processing techniques can be used in extracting content from documents, however these techniques oftentimes cannot capture semantic information about the content, especially on a granular level that may be needed by automated systems in performing various tasks. That is to say, the document representations generated using different conventional natural language processing techniques are often not sufficiently interpretable, and the captured information in these representations can be diluted without proper processing. As a result, the effectiveness of using these document representations in downstream automated tasks can be limited.

Accordingly, various embodiments of the disclosure provided herein address many of the technical disadvantages encountered during extracting content from documents through manual or conventional automated processes. Specifically, embodiments of the disclosure provide a novel unsupervised embedding approach that automatically encodes and stores valuable and interpretable content from multi-section documents. This novel embedding approach can be used in extracting, processing, and encoding content available in multi-section documents in a format that is accessible for processing by many computing systems that perform various tasks such as analytics, automation, machine learning, and/or the like. As a result, embodiments of the disclosure can increase the capacity and efficiency of these computing systems in performing these various tasks.

In addition, various embodiments of the disclosure enable the extraction of unstructured content from documents that is normally handled by humans to be carried out in an automated fashion without human intervention. Here, embodiments facilitate the extracting, processing, and encoding of unstructured content into a format that enables many computing systems to garner semantic information from the content that can be used in performing various automated tasks. Thus, the disclosed solution is more effective, accurate, less error prone, and faster than manual implementations. In addition, various embodiments' implementations reduce the manual effort necessary to extract content from documents and reduces operational costs and inefficiencies.

Further, the embedding and clustering processes executed in various embodiments to extract and format content from multi-section documents can carry out complex mathematical operations that cannot be performed by the human mind. Additionally, the solution can reduce the computational load of various systems used in performing tasks by using the extracted and formatted content while marginally affecting the effective throughput of these systems. Accordingly, various embodiments of the present disclosure enhance the efficiency and speed of various computing systems, provide the ability to extract content from a very large number of documents, and make important contributions to various computational tasks that utilize real-time/expediated processing of documents. In doing so, various embodiments of the present disclosure make major technical contributions to improving the computational efficiency and reliability of various automated tasks. This in turn translates to more computationally efficient software systems.

Moreover, various embodiments of the present invention improve the computational efficiency of generating multi-section document representations by encoding individual sections of multi-section documents and combining the per-section encodings to generate per-document encodings. Encoding multi-section documents on a per-section level avoids computationally costly operations performed to detect cross-document features for multi-section documents in a section-agnostic manner. Thus, by using sectional arrangements of multi-section documents to guide document representation, various embodiments of the present invention reduce the computational cost of generating multi-section document representations, reduce the number of processing cycles needed to generate multi-section document representations, and reduce the amount of computational resources needed to generate multi-section document representations. In this way, various embodiments of the present invention improve the computational efficiency of generating multi-section document representations by encoding individual sections of multi-section documents and combining the per-section encodings to generate per-document encodings.

Computer Program Products, Systems, Methods, and Computing Entities

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially, such that one instruction is retrieved, loaded, and executed at a time. In some exemplary embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary System Architectures

FIG. 1 provides an illustration of a system architecture 100 that may be used in accordance with various embodiments of the disclosure. Here, the system architecture 100 includes various components involved in extracting, processing, and encoding content from multi-section documents that may come from various document sources. In addition, these various components may involve conducting various automated tasks that use the content. Accordingly, the components may include one or more application servers 110 that may be in communication with and one or more document sources 115, 120, 125 over one or more networks 130. It should be understood that the application server(s) 110 may be made up of several servers, storage media, layers, and/or other components, which may be chained or otherwise configured to interact and/or perform tasks. Specifically, the application server(s) 110 may include any appropriate hardware and/or software for interacting with the document sources 115, 120, 125 as needed to execute aspects of one or more applications for processing documents provided from the document sources 115, 120, 125 and handling data access and business logic for such.

In addition, the system architecture 100 may include one or more reviewer computing devices 135 used by individuals for conducting one or more processes that use the content extracted from the documents. For example, the reviewer computing devices 135 may be used by reviewer(s) for a health insurance provider in conducting an analysis on insurance claims in which the analysis is performed using the content extracted from the documents. Here, the reviewer device(s) 135 may be one of many different types of devices such as, for example, a desktop or laptop computer or a mobile device such as a smart phone or tablet.

As noted, the application server(s) 110, document sources 115, 120, 125, and reviewer computing device(s) 135 may communicate with one another over one or more networks 130. Depending on the embodiment, these networks 130 may comprise any type of known network such as a land area network (LAN), wireless land area network (WLAN), wide area network (WAN), metropolitan area network (MAN), wireless communication network, the Internet, etc., or combination thereof. In addition, these networks 130 may comprise any combination of standard communication technologies and protocols. For example, communications may be carried over the networks 130 by link technologies such as Ethernet, 802.11, CDMA, 3G, 4G, or digital subscriber line (DSL). Further, the networks 130 may support a plurality of networking protocols, including the hypertext transfer protocol (HTTP), the transmission control protocol/internet protocol (TCP/IP), or the file transfer protocol (FTP), and the data transferred over the networks 130 may be encrypted using technologies such as, for example, transport layer security (TLS), secure sockets layer (SSL), and internet protocol security (IPsec). Those skilled in the art will recognize FIG. 1 represents but one possible configuration of a system architecture 100, and that variations are possible with respect to the protocols, facilities, components, technologies, and equipment used.

Exemplary Computing Entity

FIG. 2 provides a schematic of a computing entity 200 that may be used in accordance with various embodiments of the present disclosure. For instance, the computing entity 200 may be one or more of the application servers 110, and in some instances one or more of the reviewer computing devices 135, previously described in FIG. 1. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 200 shown in FIG. 2 may be embodied as a plurality of computing entities, tools, and/or the like operating collectively to perform one or more processes, methods, and/or steps. As just one non-limiting example, the computing entity 200 may comprise a plurality of individual data tools, each of which may perform specified tasks and/or processes.

Depending on the embodiment, the computing entity 200 may include one or more network and/or communications interfaces 225 for communicating with various computing entities, such as by communicating data, content, information, and/or similar terms used herein interchangeably that can be transmitted, received, operated on, processed, displayed, stored, and/or the like. Thus, in certain embodiments, the computing entity 200 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 200 includes or is in communication with one or more processing elements 210 (also referred to as processors, processing circuitry, and/or similar terms used herein interchangeably) that communicate with other elements within the computing entity 200 via a bus 230, for example, or network connection. As will be understood, the processing element 210 may be embodied in several different ways. For example, the processing element 210 may be embodied as one or more complex programmable logic devices (CPLDs), microprocessors, multi-core processors, coprocessing entities, application-specific instruction-set processors (ASIPs), and/or controllers. Further, the processing element 210 may be embodied as one or more other processing devices or circuitry. The term circuitry may refer to an entirely hardware embodiment or a combination of hardware and computer program products. Thus, the processing element 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 210 may be configured for a particular use or configured to execute instructions stored in volatile or non-volatile media or otherwise accessible to the processing element 210. As such, whether configured by hardware, computer program products, or a combination thereof, the processing element 210 may be capable of performing steps or operations according to embodiments of the present disclosure when configured accordingly.

In various embodiments, the computing entity 200 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 220, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 220 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and, in a general sense, to refer to a structured or unstructured collection of information/data that is stored in a computer-readable storage medium.

In particular embodiments, the memory media 220 may also be embodied as a data storage device or devices, as a separate database server or servers, or as a combination of data storage devices and separate database servers. Further, in some embodiments, the memory media 220 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein communicate with various information sources and/or devices in which some or all the information/data required for various embodiments of the disclosure may be stored.

In various embodiments, the computing entity 200 may further include or be in communication with volatile media (also referred to as volatile storage, memory, memory storage, memory circuitry and/or similar terms used herein interchangeably). For instance, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 215 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 210. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 200 with the assistance of the processing element 210 and operating system.

As will be appreciated, one or more of the computing entity's components may be located remotely from other computing entity components, such as in a distributed system. Furthermore, one or more of the components may be aggregated and additional components performing functions described herein may be included in the computing entity 200. Thus, the computing entity 200 can be adapted to accommodate a variety of needs and circumstances.

Exemplary System Operations

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Turning briefly to FIG. 3, a process 300 is shown that may be used in extracting content from a multi-section document 310. Here, the multi-section document 310 may be provided in any number of formats such as, for example, portable document format (PDF), extensible markup language (XML), Microsoft Word, hypertext markup language (HTML), and/or the like. Therefore, the process 300 begins with text extraction 315 from the multi-section document 310. Accordingly, the text extraction 315 may be carried out using a number of different mechanisms and/or a number of different approaches as those of ordinary skill in the art will recognize in light of this disclosure. As a result, the multi-section document 310 may be represented as a string of text (e.g., alphanumeric characters). In some instances, the text extraction 315 may include representations for other objects besides alphanumeric characters such as images, tables, graphs, and/or the like.

Next, the process 300 may continue with performing one or more text processing operations 320 on the text of the multi-section document 310. For example, the text processing operations 320 may involve normalization, formatting, stemming, tokenization, segmentation, lemmatization, and/or the like. Here, segmentation may be performed to group the text according to sections found in the multi-section document 310. Accordingly, the sections of text may be identified using a section type identifier. For example, the section type identifier may be an identifier provided in metadata for the section of the multi-section document 310, may be a section title provided in the text of the multi-section document 310, and/or may be identified for the section based at least in part on the text found in the section of the multi-section document 310.

Once the text processing 320 has been performed, the process 300 continues with feature extraction 325. During this phase, various embodiments of the disclosure are configured to generate an inferred document representation 330 for the multi-section document 310. In particular embodiments, the inferred document representation 330 is provided as a structured representation that enables one or more automated systems to use the inferred document representation 330 to perform various tasks. Accordingly, the inferred document representation 330 may enable these automated systems to identify the content found in the different sections of the multi-section document 310. Further detail is now provided on how various embodiments of the disclosure carry out feature extraction 325 to produce the inferred document representation 330 for a multi-section document 310.

Cluster Identification Module

Turning now to FIG. 4, additional details are provided regarding a process flow for generating per-type section clusters for a section that may be found in a multi-section document according to various embodiments. FIG. 4 is a flow diagram showing a cluster identification module for performing such functionality according to various embodiments of the disclosure. For example, the flow diagram shown in FIG. 4 may correspond to operations carried out by a processing element 210 in a computing entity 200, such as an application server 110 described in FIG. 1, as it executes operations associated with a cluster identification module stored in the computing entity's volatile and/or nonvolatile memory.

Therefore, the process 400 begins in various embodiments with the cluster identification module receiving a section batch having a set of common-type sections from multi-section documents found in a document corpus in Operation 410. Accordingly, in particular embodiments, the section batch may be associated with a particular type of section found in the multi-section documents of the document corpus. For example, the documents in the corpus may be contracts used by a health insurance provider setting forth the rules and regulations between the health insurance provider and healthcare service providers who receive payments on insurance claims submitted to the health insurance provider. In this example, the content found in the contracts may be used by an automated claim adjudication system that performs analysis on various insurance claims submitted by the healthcare service providers in determining whether or not the claims are valid. Therefore, the section batch may be associated with a section type identifier and each of the common-type sections found in the section batch may be the text found in the corresponding section of the multi-section documents found in the document corpus. For instance, returning to the example, the section may be associated with the section type identifier "Section I" and each of the common-type sections found in the section batch may be the text found in the contracts under the heading "Section I."

The cluster identification module selects a common-type section from the section batch in Operation 415. Once selected, the cluster identification module processes the text of the common-type section to generate an embedding representation of the common-type section in Operation 420. Here, in particular embodiments, the embedding representation is configured to identify semantic characteristics of the common-type section. Embedding is used in these embodiments to transform the text of the common-type section into a numerical representation of the text's semantic meaning. Therefore, in some embodiments, the embedding representation for the common-type section is made up of a vector of numerical values, in which each numerical value represents a semantic characteristic of the text found in the common-type section. Accordingly, two common-type sections with similar embedding representations are semantically similar.

Depending on the embodiments, the cluster identification module may be configured to generate the embedding representation for the text found in the common-type section using any one of a number of different embedding techniques. For instance, in some embodiments, the cluster identification module may be configured to generate an embedding for the common-type section based at least in part on meaningful word embeddings for the words found in the text of the section. In some embodiments, the cluster identification module may be configured to generate an embedding for the common-type section based at least in part on meaningful words found in the text of the section and also on other possible information that can be available for the common-type section. For example, other information may be associated with the common-type section such as a tag that identifies addition information for the section found in the another document, system, data store, and/or the like. Here, some vector arithmetic is performed on all the vectors corresponding to the words found in the text of the common-type section to summarize them into a single vector in the same embedding space. For example, the summarization operators average or sum may be used. While in other embodiments, the cluster identification module may be configured to perform embedding based at least in part on some type of paragraph vector technique (e.g., a Doc2Vec technique and/or a Paragraph2Vector technique). Examples of paragraph vector techniques include the paragraph vectors: distributed memory (PV-DM) technique or the paragraph vectors: distributed bag of words (PV-DBOW) technique. In other embodiments Language Models can be used, such as Transformers architectures and/or the alike.

Once the cluster identification module has generated the embedding representation for the text found in the common-type section, the cluster identification module determines whether another common-type section is found in the section batch in Operation 425. If so, then the cluster identification module returns to Operation 415, selects the next common-type section from the section batch, and generates an embedding representation for the text found in the newly selected common-type section.

Once the cluster identification module has generated embedding representations for all of the common-type sections found in the section batch, then the cluster identification module performs clustering on the embedding representations in Operation 430. Accordingly, in various embodiments, the cluster identification module performs the clustering on the embedding representations to generate clusters of embedding representations having similar semantic meaning together. Here, the cluster identification module may use a section clustering machine learning model in developing the per-type section clusters for the section batch. For instance, in various embodiments, the section clustering machine learning model may be an unsupervised machine learning model such as, for example, a k-means clustering model, a sequential clustering model, a hierarchical clustering, a Gaussian mixture model, a dimensionality reduction technique and/or the like. The embedding representations of the various common-type sections found in the section batch may be used by the section clustering machine learning model to generate the plurality of per-type section clusters. In particular embodiments, each per-type section cluster includes a related section subset of the plurality of common-type sections associated with the related section type identifier in which the related section subset is clustered based at least in part on the common-type sections found in the subset having common/similar semantic characteristics. Therefore, each of the per-type section clusters may represent a type of information that may be found in the particular section if the section is included in a multi-section document.

For example, the section may be associated with the section type identifier "Article I" and may be a section commonly found in a particular type of contract used by an entity. In this example, the cluster identification module may have developed three clusters from the common-type sections found in the section batch for this particular section. The first per-type section cluster may represent instances when the section is used to identify the parties involved in the contract, the second per-type section cluster may represent instances when the section is used for the recitals to identify the primary purposes of the contract, and the third per-type section cluster may represent instances when the section is used to define various terms found in the contract. In addition, each of the per-type section clusters may be assigned a per-type section cluster identifier.

FIG. 8A and FIG. 8B depict an operational example of generating per-type section clusters 812 for a Section No based at least in part on a section batch 811 associated with Section N. As depicted in FIG. 8A and FIG. 8B, the per-type section clusters are generated based at least in part on embedding representations generated using a section embedding technique 813 and using a clustering module 814.

After developing the clusters for the section, the cluster identification module in particular embodiments generates a summary for each per-type section cluster for the section. Therefore, in these particular embodiments, the cluster identification module selects the related section subset of the common-type sections for a particular per-type section cluster in Operation 435. The cluster identification module then generates a summary for the particular per-type section cluster in Operation 440. Here, the cluster identification module may be configured to perform a summarization analysis on the content found in the related section subset to generate the summary. For instance, in some embodiments, the cluster identification module may use a document summarization machine learning model to develop the per-type section cluster summary for the particular per-type section cluster. The per-type section cluster summary may provide a summary (e.g. brief explanation) of the content found in a section that has been assigned to the cluster. An operational example of generating a per-type section cluster summary 911 based at least in part on a section subset 912 that includes each section that is in a corresponding per-type section cluster is depicted in FIG. 9.

In some embodiments, the document summarization machine learning model may be a natural language processing model. Here, the document summarization machine learning model may be configured to process the content found in one or more of the common-type sections of the section subset associated with the particular per-type section cluster to generate the per-type section cluster summary. That is to say, the document summarization machine learning model may be configured to process the text found in one or more of the common-type sections in the section subset to produce a concise and fluent summary while preserving key information content and overall meaning.

In some embodiments, the document summarization machine learning model may be configured to perform an extractive summarization of the text. Here, the document summarization machine learning model may be configured to identify the important sentences or phrases from the text and extract those from the text to form the summary. For instance, the document summarization machine learning model may be a textrank model. In other embodiments, the document summarization machine learning model may be configured to perform an abstractive summarization of the text. In these embodiments, the document summarization machine learning model may be configured to generate new sentences from the text. For instance, the document summarization machine learning model may be a sequence-to-sequence (Seq2Seq) deep learning model that utilizes a variant of a recurrent neural network (e.g., gated recurrent neural network or long short memory) to generate a text summary using a many-to-many Seq2Seq problem. After generating the per-type section cluster summary for the particular cluster, the cluster identification module determines whether another per-type section cluster exists for the section in Operation 445. If so, then the cluster identification module returns to Operation 435, selects the section subset for next per-type section cluster for the section, and generates a summary for the next per-type section cluster. Once the cluster identification module has generated the summary for each per-type section cluster for the section, then the process 400 ends.

Accordingly, a section batch for each type of section that may be found in the multi-section documents of the document corpus may be processed by the cluster identification module to develop a plurality of per-type section clusters for each type of section. Depending on the embodiment, a section clustering machine learning model may be developed independently for each section type or one section clustering machine learning model may be developed based at least in part on all of the section types. As further detailed herein, the section clustering machine learning model may be used in various embodiments to process a new multi-section document and assign per-type section clusters to the different sections of the document.

Document Representation Module

Turning now to FIG. 5, additional details are provided regarding a process flow for generating an inferred document representation for a multi-section document according to various embodiments. FIG. 5 is a flow diagram showing a document representation module for performing such functionality according to various embodiments of the disclosure. For example, the flow diagram shown in FIG. 5 may correspond to operations carried out by a processing element 210 in a computing entity 200, such as an application server 110 described in FIG. 1, as it executes the document representation module stored in the computing entity's volatile and/or nonvolatile memory.

The process 500 begins in various embodiments with the document representation module receiving a multi-section document with the content of the document organized into different sections found within the document in Operation 510. Depending on the embodiment, the document representation module may be configured to receive the multi-section document as input from another system or from a user profile of the document representation module, or the document representation module may be configured to receive the multi-section document by accessing the document from a document source 115, 120, 125. In addition, depending on the embodiment, the document representation module may be configured to preprocess the multi-section document, or the multi-section document may be preprocessed prior to the document representation module receiving the document. Accordingly, the different sections of the document may be identified and associated with corresponding section type identifiers.

The document representation module selects one of the sections of the document in Operation 515. The document representation module then generates an embedding representation of the section in Operation 520. Accordingly, in various embodiments, the document representation module may generate the embedding representation of the section in a similar manner as the cluster identification module described herein. Therefore, the embedding representation may be a numerical representation of the section's semantic meaning. Here, the embedding representation may be made up of a vector of numerical values, in which each numerical value represents a semantic characteristic of the content (e.g., text) found in the section of the multi-section document.

The document representation module may then assign a cluster to the section of the multi-section document in Operation 525. Thus, in various embodiments, the document representation module may use the section clustering machine learning model described herein to assign a cluster to the section of the multi-section document. As previously mentioned, the section clustering machine learning model may be trained to identify a cluster for the particular section type associated with the section or the section clustering machine learning model may be trained to identify a cluster for all the different section types that may be found in the multi-section document or a combination of both. Therefore, the document representation module may select the section clustering machine learning model to use for the section based at least in part on the section type identifier associated with the section of the multi-section document and provide the embedding representation of the section as input to the section clustering machine learning model to assign a cluster to the section. While in some embodiments, the document representation module may provide the section type identifier, along with the embedding representation, as input to the section clustering machine learning model. Accordingly, the section clustering machine learning model provides as output an inferred per-type section cluster identifier for the per-type section cluster assigned to the section of the multi-section document. In some embodiments, the cluster of a section in a multi-section document is determined based at least in part on the per-type section cluster for the section, as determined in accordance with aspects of the process 400 of FIG. 4.

The document representation module then determines whether the document has another section in Operation 530. If so, then the document representation module returns to Operation 515, selects the next section for the document, and assigns a cluster to the newly selected section in the same manner as just described.

Once the document representation module has assigned a per-type section cluster to each of the sections found in the document, the document representation module generates an inferred document representation for the document in Operation 535. Here, in various embodiments, the inferred document representation includes each of the inferred per-type section cluster identifiers for each of the sections found in the document. For example, in particular embodiments, the inferred document representation is a vector of the inferred per-type section cluster identifiers. In some embodiments, the vector may include a plurality of feature values in which each feature value of the vector describes properties of a particular section that may appear in a document. For instance, each feature value may be associated with a section type identifier associated with a particular section. Therefore, in these embodiments, feature values associated with sections that are not found in a particular multi-section document may be set to a default numerical value (e.g., to zero), while the feature values for sections that are found in the particular multi-section document may be set to the corresponding inferred per-type section cluster identifiers for the sections.

Accordingly, in various embodiments, the inferred document representation is configured in a manner that may be conducive to providing the inferred document representation as input to one or more automatic systems in a manner that enables such systems to infer semantic information about the various sections found in the multi-section document. In addition, the inferred document representation may be configured in a manner that enables reconfiguration so that new features may be easily added to the representation when new sections that may be found in a multi-section document are identified.

In addition, although not shown in FIG. 5, the document representation module (or some other module) in particular embodiments may be configured to generate a multi-section document summary for the multi-section document. Here, the document representation module may use the inferred per-type section cluster identifiers found in the inferred document representation for the various sections of the multi-section document to retrieve the corresponding per-type section cluster summaries to generate the multi-section document summary.

Turning now to FIG. 6, an example of a multi-section document in the form of a contract 600 is made up of multiple pages 610, 620, 630 having multiple sections 611, 612, 621, 622, 631 on pages 610, 620, 630. Accordingly, the document representation module may process the various sections 611, 612, 621, 622, 631 of the contract 600 and identify an inferred per-type section cluster for each section 611, 612, 621, 622, 631 to generate an inferred document representation 640 having the corresponding per-type section cluster identifier for each section 611, 612, 621, 622, 631. Each per-type section cluster identifier may be a numerical value identifying the cluster assigned to the corresponding section 611, 612, 621, 622, 631 of the contract 600.

As previously noted, the per-type section cluster identifier for a section 611, 612, 621, 622, 631 may then be used to retrieve and/or display a per-type section cluster summary for the section 611, 612, 621, 622, 631. For example, a per-type section cluster identifier for the cluster_section_1 having a value of eight may be associated with a per-type section cluster summary 650 explaining that the content found in this particular section 611 of the contract 600 is related to the transfer of a customer. In addition, the per-type section cluster summary 650 may provide information indicating when this section 611 of the contract is applicable. Such information may be helpful to an individual who is reviewing the contract and can use the per-type section cluster summary 650 to quickly identify those sections 611, 612, 621, 622, 631 of the contract 600 to review in detail.

As depicted in FIG. 6, the inferred document representation 640 includes a set of values each associated with a candidate section type identifier in a section schema, where each value describes: (i) whether the contract 600 includes a section corresponding to the candidate section type identifier, and (ii) if the contract 600 includes a section corresponding to the candidate section type identifier, what is the per-type section cluster identifier for the section. For example, as depicted in FIG. 6, the first value of the inferred document representation 640 may describe that the contract 600 includes a section corresponding to the candidate section type identifier 1 and that the noted section is in the eighth per-type section cluster for the candidate section type identifier 1. The second value of the inferred document representation 640 may describe that the contract 600 includes a section corresponding to the candidate section type identifier 2 and that the noted section is in the second per-type section cluster for the candidate section type identifier 2. The last value of the inferred document representation 640 may describe that the contract 600 does not include a section corresponding to the candidate section type identifier N.

The operational examples of three inferred document representations 1001-1003 for three multi-section documents 1011-1013 are depicted in FIG. 10. For example, the inferred document representation 1001 describes that the multi-section document 1011 has a section corresponding to the candidate section type identifier 1 that is in the eighth per-type section cluster for the noted candidate section type identifier, a section corresponding to the candidate section type identifier 2 that is in the second per-type section cluster for the noted candidate section type identifier, and has no sections corresponding to the candidate section type identifier No. The inferred document representation 1002 describes that the multi-section document 1012 has a section corresponding to the candidate section type identifier 1 that is in second per-type section cluster for the noted candidate section type identifier, a section corresponding to the candidate section type identifier 2 that is in the first per-type section cluster for the noted candidate section type identifier, and a section corresponding to the candidate section type identifier N that is in the eighty-second per-type section cluster for the noted candidate section type identifier. The inferred document representation 1003 describes that the multi-section document 1013 has a section corresponding to the candidate section type identifier 1 that is in second per-type section cluster for the noted candidate section type identifier, a section corresponding to the candidate section type identifier 2 that is in the sixth per-type section cluster for the noted candidate section type identifier, and a section corresponding to the candidate section type identifier N that is in the twelfth per-type section cluster for the noted candidate section type identifier.

Application of Document Representation

As previously noted, the inferred document representation generated for a multi-section document accordingly to various embodiments of the present disclosure is configured so that the representation can be easily used along with automated systems in performing different data processing tasks. For instance, the inferred document representation may be configured as a vector with various features representing different sections of a multi-section document. Each feature may have a numerical value representing the type of content (e.g., semantics) found in a particular section of the multi-section document. Accordingly, such a configuration of the inferred document representation may enable the representation to be easily interpreted by automated systems in performing different tasks.

For example, in the insurance industry, the configuration of the inferred document representation may enable the use of the representation in facilitating such tasks as pre-pay and post-pay data mining operations. For instance, the inferred document representation of a contract in place, along with a given claim, may be provided as input to a model used by an automated system to identify whether the claim is legitimate or a possible overpayment. In some embodiments, the inferred document representation may be used by an automated system to identify and explain unusual contracts and/or sections of contracts. In addition, the inferred document representation may be used in an automated claim adjudication system for recovery purposes, as well as other automated systems such as an audit system. Those of ordinary skill in the art can envision other instances in which the inferred document representation may be used in performing various automated tasks in light of this disclosure.

Turning to FIG. 7, this figure provides an example of using the inferred document representation of a multi-section document generated in accordance with various embodiments of the disclosure in an automated overpayment classification system 700. Here, the automated overpayment classification system 700 is configured to use a machine learning model 730 in predicting whether an insurance claim may be subject to overpayment. Therefore, the input layer 710 for the machine learning model 730 may generate different types of features such as continuous features 715, categorical features 720, and the inferred document representation 725 of the contract in place between the healthcare service provider who has submitted the claim and the health insurance provided. The inferred document representation has numerical features identifying the content found in the various sections of the contract that makes the representation ideal as input to the machine learning model 730. Accordingly, the machine learning model 730 processes the input layer 710 and generates a prediction 735 as to whether the claim may be subject to overpayment. Here, the output 740 from the machine learning model 730 provides a prediction score of 0.98, indicating the claim is very likely subject to overpayment. In addition, the output indicates the relevant features with respect to the claim being likely subject to overpayment. Further, the output indicates the relevant contract features along with a summary of each relevant section of the contract explaining its importance.

Accordingly, in particular embodiments, the output 740 may be presented on a prediction output user interface so that the output 740 may be viewed by an individual (e.g., claims reviewer). Other predictive-based actions may be carried out in other embodiments: for example, payment of the claim may be placed on an automatic hold, the claim may be identified for auditing purposes, and/or the like. In addition, other presentations may be provided via the prediction output user interface such as, for example, the multi-section document summary previously described. Those of ordinary skill in the art can envision other predictive-based actions that may be carried out in light of this disclosure. An operational example of a prediction output user interface 1100 that may be provided as an output 740 that is generated based at least in part on the prediction 735 is depicted in FIG. 11.

CONCLUSION

Many modifications and other embodiments of the disclosure set forth herein will come to mind to one skilled in the art to which these modifications and other embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for automated generation of an inferred document representation for a multi-section document to convey detailed content granularity of semantic characteristics within the multi-section document, the computer-implemented method comprising:
   identifying, by one or more processors, a document corpus comprising the multi-section document and a plurality of other multi-section documents, wherein the multi-section document comprises a plurality of sections that are respectively associated with a plurality of document-wide section type identifiers;
   identifying, by the one or more processors, a section batch from a current section of the plurality of sections that is associated with a current section type identifier from the plurality of document-wide section type identifiers, wherein:
      (i) the section batch comprises a plurality of common-type sections that is associated with the current section type identifier,
      (ii) the plurality of common-type sections comprises the current section and one or more other sections that are associated with the current section type identifier across the plurality of other multi-section documents, and
      (iii) the current section type identifier corresponds to one or more semantic characteristics of the plurality of common-type sections;
   inputting, by the one or more processors, the section batch to an unsupervised section clustering machine learning model to generate a plurality of per-type section clusters for the current section type identifier, wherein:
      (i) each per-type section cluster of the plurality of per-type section clusters comprises a related section subset of the plurality of common-type sections, and
      (ii) the plurality of per-type section clusters comprises an inferred per-type section cluster for the current section;
   generating, by the one or more processors, the inferred document representation for the multi-section document based at least in part on a plurality of inferred per-type section clusters, including the inferred per-type section cluster, respectively generated for the plurality of sections; and
   initiating, by the one or more processors, performance of one or more prediction-based actions based at least in part on the inferred document representation.

2. The computer-implemented method of claim 1, further comprising:
identifying, by the one or more processors, a section schema associated with the document corpus, wherein: (i) the section schema describes a group of corpus-wide section type identifiers for the document corpus, and (ii) the group of corpus-wide section type identifiers comprise the plurality of document-wide section type identifiers.

3. The computer-implemented method of claim 2, wherein:
the inferred document representation describes a plurality of per-type section cluster identifiers;
a per-type section cluster identifier of the plurality of per-type section cluster identifiers is associated with a corpus-wide section type identifier of the group of corpus-wide section type identifiers;
the per-type section cluster identifier for the corpus-wide section type identifier of the group of corpus-wide section type identifiers that is among the plurality of document-wide section type identifiers describes the inferred per-type section cluster for the current section of the plurality of sections that is associated with the corpus-wide section type identifier; and
the per-type section cluster identifier for the corpus-wide section type identifier of the group of corpus-wide section type identifiers that is not among the plurality of document-wide section type identifiers describes a default numerical value.

4. The computer-implemented method of claim 1, further comprising:
processing, by the one or more processors, a per-type section cluster of the plurality of per-type section clusters using a document summarization machine learning model to generate a per-type section cluster summary for the per-type section cluster.

5. The computer-implemented method of claim 4, wherein generating the per-type section cluster summary for the per-type section cluster of the plurality of per-type section clusters comprises:
processing the related section subset for the per-type section cluster using the document summarization machine learning model to generate the per-type section cluster summary.

6. The computer-implemented method of claim 4, wherein performing the one or more prediction-based actions comprises:
causing presentation of a prediction output user interface, wherein: (i) the prediction output user interface describes a multi-section document summary for the multi-section document, and (ii) the multi-section document summary describes each the per-section type cluster summary for the per-type section cluster of the plurality of per-type section clusters.

7. The computer-implemented method of claim 1, wherein performing the one or more prediction-based actions comprises:
causing presentation of a prediction output user interface, wherein the prediction output user interface describes the inferred document representation.

8. The computer-implemented method of claim 7, wherein the prediction output user interface describes a multi-section document summary for the multi-section document.

9. A system for automated generation of an inferred document representation for a multi-section document to convey detailed content granularity of semantic characteristics within the multi-section document, the system comprising memory and one or more processors communicatively coupled to the memory, the one or more processors configured to:
identify a document corpus comprising the multi-section document and a plurality of other multi-section documents, wherein the multi-section document comprises a plurality of sections that are respectively associated with a plurality of document-wide section type identifiers;
identify a section batch from a current section of the plurality of sections that is associated with a current section type identifier from the plurality of document-wide section type identifiers, wherein:
(i) the section batch comprises a plurality of common-type sections that are associated with the current section type identifier,
(ii) the plurality of common-type sections comprises the current section and one or more other sections that are associated with the current section type identifier across the plurality of other multi-section documents, and
(iii) the current section type identifier corresponds to one or more semantic characteristics of the plurality of common-type sections;
input the section batch to an unsupervised section clustering machine learning model to generate a plurality of per-type section clusters for the current section type identifier, wherein:
(i) each per-type section cluster of the plurality of per-type section clusters comprises a related section subset of the plurality of common-type sections, and
(ii) the plurality of per-type section clusters comprises an inferred per-type section cluster for the current section;
generate the inferred document representation for the multi-section document based at least in part on a plurality of inferred per-type section clusters, including the inferred per-type section cluster, respectively generated for the plurality of sections; and
initiate performance of one or more prediction-based actions based at least in part on the inferred document representation.

10. The system of claim 9, wherein the memory and the one or more processors are configured to:
identify a section schema associated with the document corpus, wherein: (i) the section schema describes a group of corpus-wide section type identifiers for the document corpus, and (ii) the group of corpus-wide section type identifiers comprise the plurality of document-wide section type identifiers.

11. The system of claim 10, wherein:
the inferred document representation describes a plurality of per-type section cluster identifiers;
a per-type section cluster identifier of the plurality of per-type section cluster identifiers is associated with a corpus-wide section type identifier of the group of corpus-wide section type identifiers;
the per-type section cluster identifier for the corpus-wide section type identifier of the group of corpus-wide section type identifiers that is among the plurality of document-wide section type identifiers describes the inferred per-type section cluster for the current section of the plurality of sections that is associated with the corpus-wide section type identifier; and
the per-type section cluster identifier for the corpus-wide section type identifier of the group of corpus-wide section type identifiers that is not among the plurality of document-wide section type identifiers describes a default numerical value.

12. The system of claim 9, wherein the one or more processors are further configured to:
process a per-type section cluster of the plurality of per-type section clusters using a document summarization machine learning model to generate a per-type section cluster summary for the per-type section cluster.

13. The system of claim 12, wherein the one or more processors are further configured to:
process the related section subset for the per-type section cluster using the document summarization machine learning model to generate the per-type section cluster summary.

14. The system of claim 12, wherein the one or more processors are further configured to:
cause presentation of a prediction output user interface, wherein: (i) the prediction output user interface describes a multi-section document summary for the multi-section document, and (ii) the multi-section document summary describes each per-section type cluster summary for the per-type section cluster of the plurality of per-type section clusters.

15. One or more non-transitory computer-readable storage media for automated generation of an inferred document representation for a multi-section document to convey detailed content granularity of semantic characteristics within the multi-section document, the one or more non-transitory computer-readable storage media including instructions that, when executed by one or more processors, cause the one or more processors to:
identify a document corpus comprising the multi-section document and a plurality of other multi-section documents, wherein the multi-section document comprises a plurality of sections that are respectively associated with a plurality of document-wide section type identifiers;
identify a section batch from a current section of the plurality of sections that is associated with a current section type identifier from the plurality of document-wide section type identifiers, wherein:
(i) the section batch comprises a plurality of common-type sections that is associated with the current section type identifier,
(ii) the plurality of common-type sections comprises the current section and one or more other sections that are associated with the current section type identifier across the plurality of other multi-section documents, and
(iii) the current section type identifier corresponds to one or more semantic characteristics of the plurality of common-type sections;
input the section batch to an unsupervised section clustering machine learning model to generate a plurality of per-type section clusters for the current section type identifier, wherein:
(i) each per-type section cluster of the plurality of per-type section clusters comprises a related section subset of the plurality of common-type sections, and
(ii) the plurality of per-type section clusters comprises an inferred per-type section cluster for the current section;
generate the inferred document representation for the multi-section document based at least in part on a plurality of inferred per-type section clusters, including the inferred per-type section cluster, respectively generated for the plurality of sections; and
initiate performance of one or more prediction-based actions based at least in part on the inferred document representation.

16. The one or more non-transitory computer-readable storage media of claim 15, further including instructions that, when executed by the one or more processors, cause the one or more processors to:
identify a section schema associated with the document corpus, wherein: (i) the section schema describes a group of corpus-wide section type identifiers for the document corpus, and (ii) the group of corpus-wide section type identifiers comprise the plurality of document-wide section type identifiers.

17. The one or more non-transitory computer-readable storage media of claim 16, wherein:
the inferred document representation describes a plurality of per-type section cluster identifiers;
a per-type section cluster identifier of the plurality of per-type section cluster identifiers is associated with a corpus-wide section type identifier of the group of corpus-wide section type identifiers;
the per-type section cluster identifier for the corpus-wide section type identifier of the group of corpus-wide section type identifiers that is among the plurality of document-wide section type identifiers describes the inferred per-type section cluster for the current section of the plurality of sections that is associated with the corpus-wide section type identifier; and
the per-type section cluster identifier for the corpus-wide section type identifier of the group of corpus-wide section type identifiers that is not among the plurality of document-wide section type identifiers describes a default numerical value.

18. The one or more non-transitory computer-readable storage media of claim 15, further including instructions that, when executed by the one or more processors, cause the one or more processors to:
process a per-type section cluster of the plurality of per-type section clusters using a document summarization machine learning model to generate a per-type section cluster summary for the per-type section cluster.

19. The one or more non-transitory computer-readable storage media of claim 18, further including instructions that, when executed by the one or more processors, cause the one or more processors to:
process the related section subset for the per-type section cluster using the document summarization machine learning model to generate the per-type section cluster summary.

20. The one or more non-transitory computer-readable storage media of claim 18, further including instructions that, when executed by the one or more processors, cause the one or more processors to:
cause presentation of a prediction output user interface, wherein: (i) the prediction output user interface describes a multi-section document summary for the multi-section document, and (ii) the multi-section document summary describes each per-section type cluster summary for the per-type section cluster of the plurality of per-type section clusters.

* * * * *